United States Patent [19]

Nichols et al.

[11] Patent Number: 4,698,664
[45] Date of Patent: Oct. 6, 1987

[54] AUDIO-VISUAL MONITORING SYSTEM

[75] Inventors: William E. Nichols, San Jose; William F. Herzog, San Martin, both of Calif.; Neil Feldman, Dallas, Tex.; William Laumeister, San Jose, Calif.

[73] Assignee: Apert-Herzog Corporation, San Jose, Calif.

[21] Appl. No.: 707,836

[22] Filed: Mar. 4, 1985

[51] Int. Cl.⁴ .............................................. H04N 5/76
[52] U.S. Cl. .................................. 358/10; 358/21 R; 358/22; 358/139; 358/181; 358/185; 358/311; 358/903; 360/14.1; 360/14.3
[58] Field of Search ............... 358/54, 311, 82, 140, 358/160, 93, 180, 181, 185, 183, 21 R, 22, 139, 10, 903; 360/14.1, 14.3

[56] References Cited

U.S. PATENT DOCUMENTS

| | | | |
|---|---|---|---|
| 3,954,098 | 5/1976 | Dick | 128/661 |
| 4,121,283 | 10/1978 | Walker | 358/82 |
| 4,302,776 | 11/1981 | Taylor | 358/160 |
| 4,435,792 | 3/1984 | Bechtolscheim | 365/230 |
| 4,538,188 | 8/1985 | Barker | 360/14.3 |

Primary Examiner—Howard W. Britton
Attorney, Agent, or Firm—David B. Harrison

[57] ABSTRACT

An analog data stream is monitored as a series of blocks. A ring memory array digitally stores the blocks and repetitively loads and unloads the blocks. A freeze switch disables loading of the latest blocks. A block identifier puts out a unique block identification value for each block put out by the memory and is responsive to the freeze switch, so that when loading stops, each block put out bears the same identification value. The invention is particularly well suited to handling of television frames.

22 Claims, 16 Drawing Figures

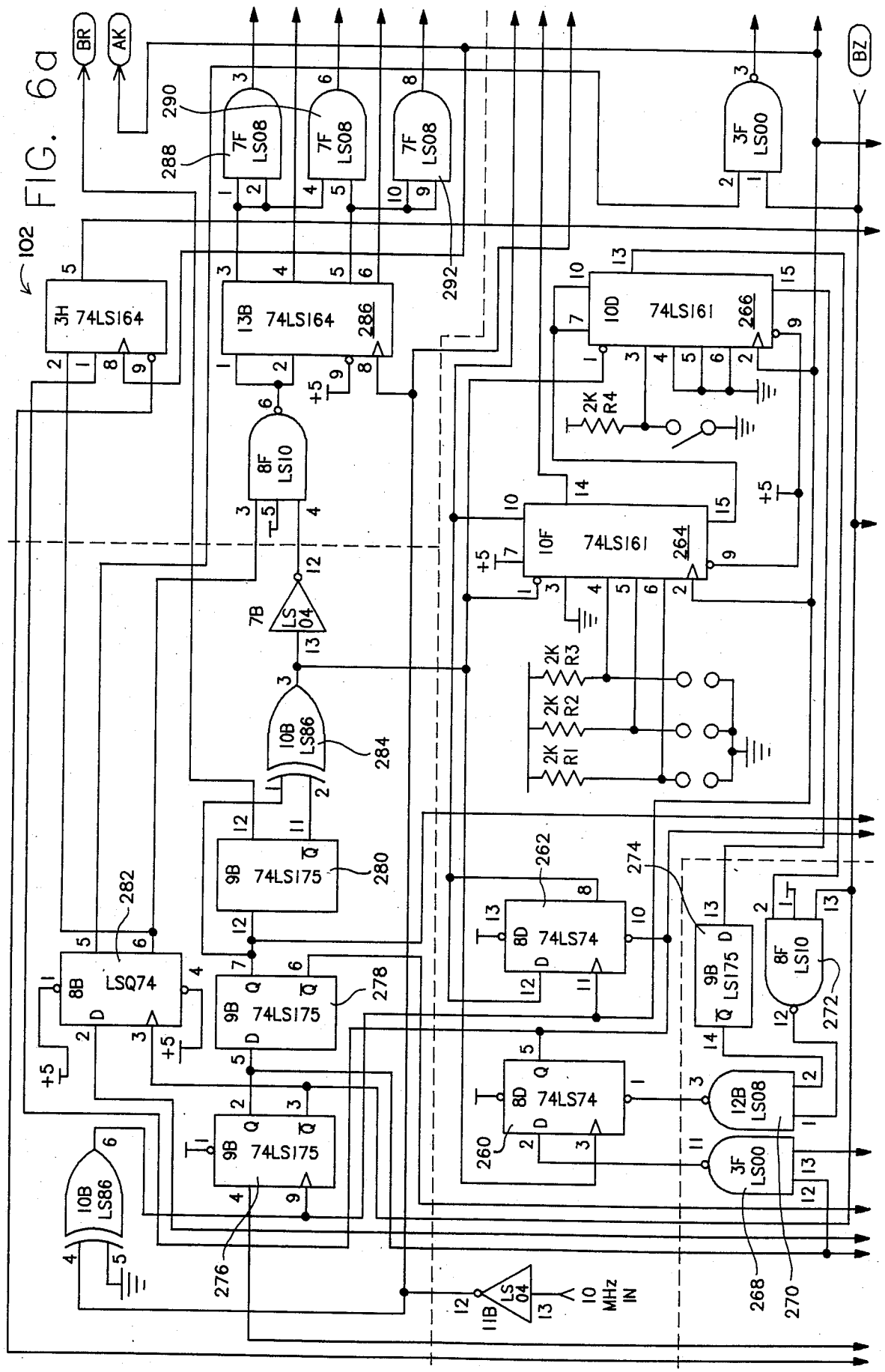

AUDIO-VISUAL MONITORING SYSTEM

BACKGROUND OF THE INVENTION

The present invention relates to a monitoring system for electronic analysis of images and sounds. More particularly, the present invention relates to apparatus and methods for generating and putting out a matrix of image frames and/or sound segments in a unique visual presentation.

Television images are typically formed as a series of scanned discrete image frames which are projected on a frame by frame basis on a suitable screen (e.g. the light generating phosphor display screen of a cathode ray tube). The persistence of the phosphors, and the insensitivity of the human eye cause an integration of the discrete frames into the appearance of a continuously moving image, usually the desired result.

There are some situations where it is desirable to inspect television images on a frame by frame basis at a slowed or still frame rate. In order to use television equipment which, for example, repeats each frame approximately 30 times per second some form of frame store must be used. The frame store records the frame to be inspected at the real time (30 Hz) rate and then reads it back over and over again, usually at the same 30 Hz rate. One widely available form of frame store is the helical scan video recorder wherein the helix dimensions and the tape velocity (and number of rotating scanning heads) are designed to store a single frame (or field) on a single diagonal track of the tape. Freeze frame viewing is achieved by stopping the tape velocity and enabling the rotating head to repeatedly scan and read out the frame. Slowed motion is also possible with some momentary loss of synchronization by slowing tape velocity from its normal rate.

More sophisticated frame stores are known and employ both analog and digital techniques in rotating disk and solid state frame stores. With the advent of high speed high capacity integrated circuit semiconductor memory, together with high speed analog to digital to analog conversion circuits and techniques, digital frame stores have supplemental analog stores for many applications, such as special effects generators in television studios wherein multiple images from multiple video sources may be combined digitally into a single frame time and put out as a viewable composite frame of multiple images. Split screen display is one example.

Film editing has typically been carried out on a frame by frame (image by image) basis. In the case of sprocketed film an editing viewer is placed between two manually operable reels. The film is then inspected to locate edit points. A complication arises if the film includes a sound track which requires normal operating velocity for intelligible playback. "Squawkboxes" emit low, guttural sounds and noises as the film moves over a sound track reader at very low speeds.

Video tape editing has employed both real time and slowed frame techniques. Electronic edit points are added to a control track, and automatic editing by insertion and deletion is carried out in accordance with the manually inserted control track edit points.

Positive editing of film and video tape with respect to sound content has been more difficult to carry out, since there has been no practical way heretofore to view a frozen frame or frames and hear at regular playback rate the audio content which accompanies the frozen frame(s).

One known approach to providing a video editing viewer (which applicants do not concede is a prior art approach), is described in United Kingdom Patent Application GB No. 2,136,653 A published Sept. 19 1984. The methods described therein required complex convolution circuitry and resulted in less than a satisfactory display of multiple miniature frames which were concentrated in a narrow vertical strip down the viewing screen. Most of the usable display screen area was unused in this other apprach. Also, no attempt was even made to play audio back at real time rates which corresponds to the television frame being frozen on the screen.

It is known to add time codes to picture frames, whether film or video. One standardized approach is the SMPTE time code, promulgated by the Society of Motion Picture and Television Artists. SMPTE time coding has replaced sprocket hole counting and film rate and has enabled the synchronization or recording systems such as visual, analog tape and digital. Application of SMPTE time codes to generation of music for sound tracks is proposed in an article by Ms Suzanne Ciani entitled "How to use SMPTE time code to create video music" published in *Video Systems Magazine*, July 1981 issue, pp. 32–33.

In some specialized applications such as the transfer of images from film to tape, called "Telecine", it is essential to detect each scene change so that the colors present in the new scene may be corrected. Heretofore, this telecine conversion operation has been carried out manually with each new scene requiring freeze framing of the film transport and with new color correction parameter being then entered, along with the SMPTE time code into a color correction computer which automatically adjusts the hue and intensity of the colors of the video playback during a second pass in the telecine conversion. The telecine conversion is carried out only after each scene change has been located and color corrected manually.

Other specialized applications giving rise to the present invention include slow frame analysis of X-ray images in such fields as diagnostic tomography.

Thus, a hitherto unsolved need has arisen for an improved monitoring system for video and/or audio images.

SUMMARY OF THE INVENTION WITH OBJECTS

A general object of the present invention is to overcome drawbacks and limitations of prior art image monitoring systems and methods.

Another object of the present invention is to provide a system which is simplified and more effective than other image monitor systems, and which has particularly useful applications in editing television program material, telecine conversion color correction, audio track editing and musical composition, and medical diagnosis.

A further object of the present invention is to generate a unique display of multiple successive picture images which simultaneously occupy substantially the entire useful display surface area of the display device and which present scene changes as a progresive rippling effect in both dimensions of the display surface area.

One more object of the present invention is to generate and display a unique video image cursor and to provide a control switching matrix for placing the cursor at a displayed image corresponding locationally to the relative location of an individual switch of the control switching matrix.

Yet another object of the present invention is to provide a multi-frame television monitoring system which monitors, stores and displays successive picture images and simultaneously accompanying audio track segments with a locally generated, unique audio cursor in the picture image and wherein the audio track segments accompanying a still-framed picture image are reproduced at normal voice/sound listening rates so that audio marking points may be precisely located.

Yet one more object of the present invention is to compress by pixel and line sampling and then store the compressed digitized picture images in a unique ring memory array holding a plurality of such images wherein latest frame writing operations are carried out during playback sweep blanking time intervals to avoid data write and readback conflicts during real time display of the compressed images.

A monitoring system incorporates the principles of the present invention with analog information such as television pictures and sounds, wherein information is divided into a series of blocks such as picture frames or audio time segments, each block being identifiable as such. The system includes an analog to digital converter connected to the source for converting the analog information into a digital stream of corresponding digital values. A ring memory array is connected to the analog to digital converter and it stores corresponding digital values. The array includes address generation circuitry for generating addresses which progress through storage locations of the array in repetitive fashion and read/write control circuitry for replacing the oldest stored corresponding digital values with the latest corresponding digital values only during playback sweep blanking intervals. A freeze switch may be operated to disable writing of latest corresponding digital values into the ring memory array.

A digital to analog converter is connected to the memory array, and it converts the stored digital values to analog values and puts them out as such to a suitable analog display such as a television monitor.

A block identifier may be included for providing and putting out a block identification value for each block put out by the digital to analog converter, the block identifier being responsive to the freeze switch so that during cessation of writing, each block put out bears the same identification value.

A temporary storage memory may be connected to the analog to digital converter for temporarily storing the digital stream at a storage rate related to the video rate of the analog data stream. The ring memory array means is then connected to the temporary storage memory and it stores during write operations a plurality of successive video frames comprised of sampled ones of the digital values from the temporary storage memory in accordance with a sampling rate which determines the minimum number of successive picture frames to be stored in the ring memory array.

A video cursor generator may be connected to the system for generating a cursor marker for a selected one of the plurality of video frames stored in the ring memory array and read by the read control circuitry. The cursor generator comprises a switch array for switchably controlling the location of placement of the cursor on a television display screen. The switch array means includes a switch dedicated to each video frame location. The switch array is laid out to correspond to the presentation of the plurality of video frames on the picture screen.

In the system a data stream of analog information, typically a sound track audio information component, has blocks thereof defined by time increments, each increment having its own time block identifier. In this case the system may further comprise an audio analog to digital converter connected to the audio source for converting an audio component of the analog information into a digital stream of corresponding digital values, an audio ring memory array connected to the audio analog to digital converter for storing the corresponding digital audio values and including an audio address generation circuit for generating addresses which progress through storage locations of the memory array in repetitive fashion and audio read/write control circuitry for replacing the oldest stored corresponding digital values with the latest corresponding digital values, and further including an audio freeze switch for disabling writing of latest corresponding digital values into the array. An audio digital to analog converter is connected to the audio memory array for converting the stored digital values to analog values and for putting them out.

An audio block identifier may be provided for putting out a unique block identification value for each audio block put out by the audio digital to analog converter, the block identifier being responsive to the freeze switch so that during cessation of writing of the audio ring memory, each audio block put out bears the same identification value.

An audio visual cursor generator generates a video cursor corresponding to the audio blocks. A cursor control switch switches cursor output between the video cursor generator and the audio visual cursor generator.

When the stream of analog information comprises a color television signal, the system further comprises a color separator connected to the signal source. The color separator separates the color television signal into a plurality of signal components, each having a luminance frequency bandwidth. The system then includes a plurality of analog to digital converters, line stores, ring memory arrays, and digital to analog converters, one each being connected in a channel for each signal component. A color combiner is connected to the digital to analog converters and combines signal components into a composite color television signal.

The video display of the present invention simultaneously displays a plurality of successive video picture frames occupying substantially the entirety of the useful display area of television picture screen. The display is generated by a method comprising the steps of:

taking N samples of each line of video and converting each sample to a digital value;

storing N/X of the samples in a multiple-frame array memory wherein X is an integer corresponding to the number of frames to be displayed in the line dimension and N equals the number of pixels in a line of video;

storing L/Y sampled lines in the array memory wherein L equals the total number of lines per image and wherein Y equals the number of frames to be displayed in a dimension normal to the line dimension;

reading the stored samples and lines from the array memory to generate a stream of image data equal to X times Y images; and, converting the stream to analog values and applying said values to operate the display screen.

The preferred image display comprises a plurality of rows and columns of picture frames wherein the region displaying the most recent frames is located in a corner of the television picture screen and scrolls from column to column in each row and row to row. Thus, the region displaying the oldest frame is located in the corner of the picture screen opposite to the corner displaying the most recent frame. This display arrangement thereby generates a unique bi-dimensional ripple pattern with each change of picture scene.

These and other objects, advantages and features of the present invention will be better understood and further appreciated by considering the following detailed description of a preferred embodiment presented with the accompanying drawings.

BRIEF DESCRIPTION OF THE DRAWINGS

In the Drawings:

FIGS. 6a, 6b, 6c, 6d, 6e, 6f, 6g, 6h and 6i comprise a more detailed electrical schematic and block diagram of the memory element 100 of the system depicted in FIG. 4.

DETAILED DESCRIPTION OF A PREFERRED EMBODIMENT

System Overview

Figure 1:
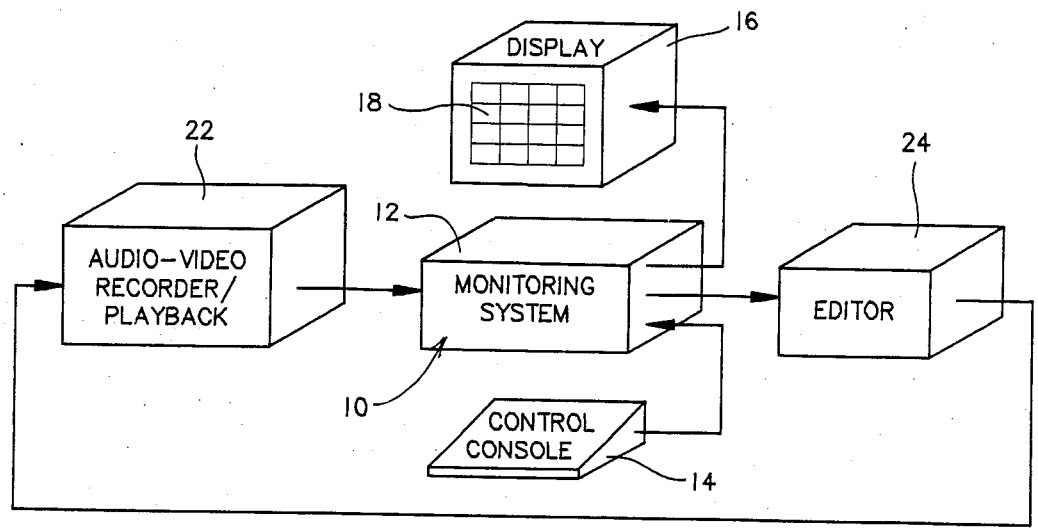
FIG. 1 is an overall environmental block diagram of an audio-visual monitoring system incorporating apparatus and principles in accordance with the present invention.

An audio-visual monitoring system 10 incorporating the principles of the present invention is depicted in the environmental block diagram of FIG. 1. Therein, the system 10 is contained within a unitary housing 12 to which a control console 14 and a color television display monitor 16 are attached. The monitor 16 includes audio channel playback facilities in order to provide both audio and video reproduction. The monitor display screen 18 is shown subdivided into a matrix of e.g. 16 separate successive image frames 20a, 20b, 20c, 20d, 20e, 20f, 20g, 20h, 20i, 20j, 20k, 20L, 20m, 20n, 20o and 20p. These frames 20 are reproduced with symbolic picture content for purposes of illustration in the enlarged picture diagram of FIG. 2. the lower right-hand corner frame 20a e.g. contains the most recent frame, and the upper left-hand corner frame 20p e.g. contains the oldest frame although other bidimensional image patterns may be employed. In this manner the display 18 presents 16 sequential frames which ripple in a sinuous, snake-like ripple pattern during scene changes, with the frames entering the display 18 at the lower right-hand corner, advancing to the left along the bottom row, jumping to the next row above on the right edge and advancing, frame by frame to the left, and so on, until the oldest frame at the upper left hand corner is reached. With a frame rate of approximately 30 frames per second, the display 18 presents approximately one half second of television in real time. The sinuous ripple pattern, shown in FIG. 2, has been found to be particularly useful to aid the operator in stopping (freezing) the display progression when a scene change occurs and is detected visually, as is illustrated between frames 20i and 20j in FIG. 2. The oldest seven frames 20j through 20p symbolically depict a sailboat on the water with the moon over the jib sail, whereas the newest nine frames 20a through 20i depict a closeup of the moon.

Figure 2:
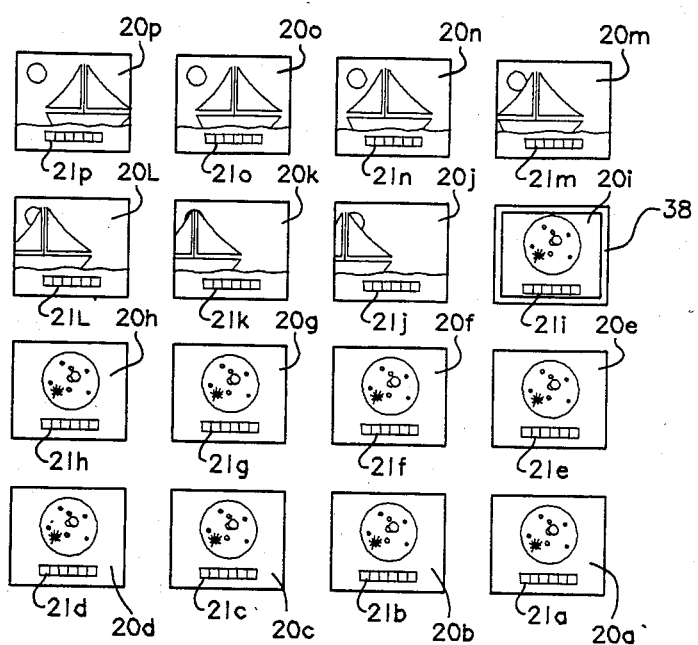
FIG. 2 is an enlarged diagrammatic view of a visual display appearing on a television monitor depicted in FIG. 1 and illustrative of principles of the present invention.

Each frame is provided with a superimposed sequential time code 21a, 21b, 21c, 21d, 21e, 21f, 21g, 21h, 21i, 21j, 21k, 21l, 21m, 21n, 21o and 21p as shown in FIGS. 2 and 5. The entire program is time coded in a conventional manner so that each successive frame carries a successive time code. In this manner, an edit may be carried out automatically, once the frame time codes of the appropriate editing locations have been ascertained and put out to responsive external equipment, such as a telecine color correction computer.

In the environment of FIG. 1, the system 10 is included within a television editing facility which further includes a source of television signals, such as a video tape recorder 22 and also an editor 24. Many other applications for the system 10 are known such as color correction in tele-cine conversion systems, medical diagnostics as with x-ray radiopaque dyes in the bloodstream and so forth; the television editing environment is thus presented by way of example and not by way of limitation of the scope of the invention.

Figure 3:
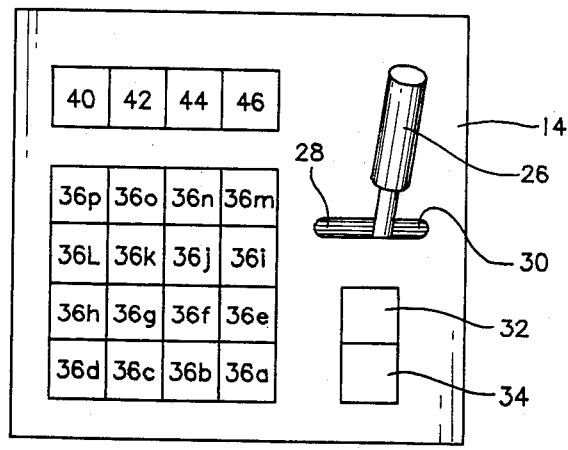
FIG. 3 is an enlarged top plan view of a control panel of the audio-visual monitoring system set forth in FIG. 1.

Controls for the system 10 are contained on the control console 14. These operator activated controls, illustrated in FIG. 3, include a bi-directional joystick 26 which operates in freeze mode to reverse the display of frames 20 in a left-ward position 28 and which operates to advance the display of frames 20 in a forward direction in a right-ward position 30. Below the joystick 26 are two switches: an audio-video select switch 32, and a freeze switch 34. The audio-video select switch 32 enables the system 10 to switch between audio time segment display and video frame display. The switch 32 determines whether the video cursor (FIG. 5A) or the audio cursor (FIG. 5B) will be put out and displayed to the operator.

The freeze switch 34 enables the operator to stop the program material from being loaded into the system, thereby enabling the operator to analyze the frames and corresponding audio segments in detail by e.g. moving them back and forth with the joystick 26. This feature of the present invention is particularly useful in tele-cine conversion systems wherein it is necessary to analyze each video scene for color content and provide color correction manually or automatically tailored to each different scene during film to tape and tape to film conversions. In automatic color correction systems, the time code corresponding to each scene change is entered into the color correction computer. Unless a sophisticated software control program is available and used, each scene change must be manually detected and signalled by the viewing operator. When the frame freeze switch is activated, and when the first frame of the next scene is isolated as by identifying the particular frame 20 representing the first frame, the time code is then sent out to the color correction computer and color correction values for the new scene may be manually or automatically provided for each new scene. Human operator reaction time to scene changes has been discovered to be approximately eight frames. Thus, by providing 16 frames 20 on the display 18, typical operator reaction at the frame freeze switch 34 will occur when the scene change has progressed half way through the rippling frame progression on the screen 18. In the event that the operator is slow to react to a scene change, the joystick may be used to recall or center the scene change, providing it remains within the 32 frames actually on store in the system memory after the freeze control 34 is activated. It has been found that the system 10 has reduced telecine conversion color correction time for feature length films from approximately twelve hours to approximately six hours.

Figure 5A:
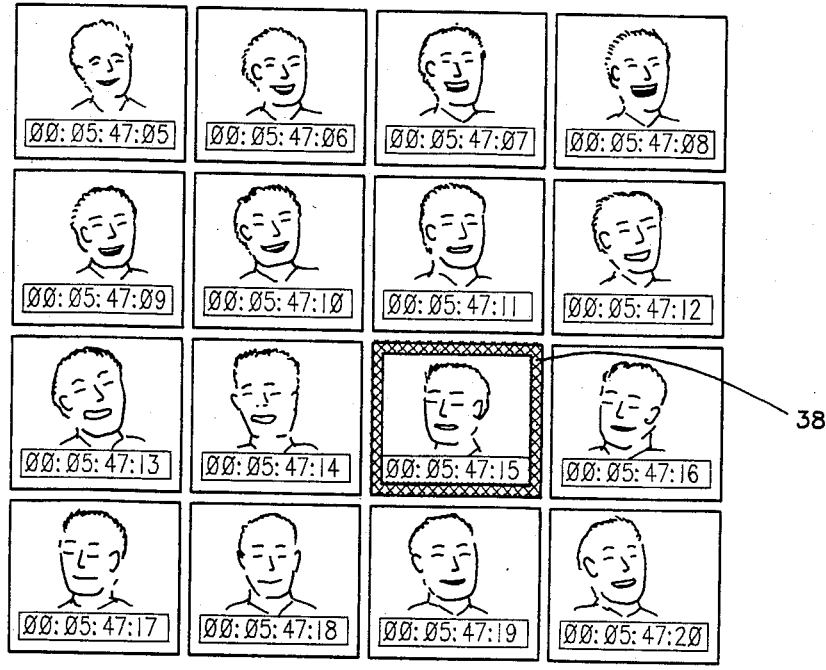
FIGS. 5A and 5B are time sequential television picture frame graphs of a television monitor display illustrating particularly the visual and audio cursors generated by the system set forth in FIG. 4.

A matrix of 16 switches 36a, 36b, 36c, 36d, 36e, 36f, 36g, 36h, 36i, 36j, 36k, 36L, 36m, 36n, 36o and 36p is provided on the console 14 to enable the operator to select one of displayed frames 20. Each switch 36 corresponds to a picture frame 20 having the same relative location in the matrix 36. Thus, switch 36a corresponds to displayed picture frame 20a, and switch 36p corresponds to displayed frame 20p. One of the switches 36 may be depressed by the operator to create a symbolic video cursor border 38 around the corresponding frame of the display (FIG. 5A). When the switch 36i is depressed, a signal border 38 is formed around the picture frame 20i, as shown in FIG. 2. The border may be white or some preselected color which stands out to the operator. The purpose of the signal border is to put out to the editor 24 the time code of the frame selected as e.g. an edit point, typically the first frame of a video cut in picture content in the telecine application. A graph of a matrix of frames including one having the video cursor is included herein as FIG. 5A.

A frame store within the system 10 stores e.g. 32 successive picture frames, some number greater than the diplay capability of the video display 18 (32 frames representing one second of real time television). An operator is then able, by operating the joystick 26, to move the display back and forth over the e.g. 32 frames stored in the memory. The freeze switch 34 controls write operations of the internal memory so that when the system 10 is in the freeze mode, the memory stops writing new frames into the memory, thereby enabling the operator to place the display at any desired successive location among the stored 32 frames by manipulation of the joystick 26 in either the reverse 28 or forward 30 directions. The joystick 26 operates progressively so that the amount of deflection thereof is related directly to control the speed of stored frame manipulation and movement.

A row of four switches 40, 42, 44 and 46 along the top left portion of the console 14 completes the operator controls. The switches 40-46 enable the operator to select the video frame sampling rate. In the system 10, the switch 40 selects a one to one sample rate; the switch 42 selects a one to two sample rate, meaning that the display 18 displays every other real-time picture frame; the switch 44 selects a one to four sample rate, and the switch 46 selects a one to 16 frame sample rate, meaning that only one in 16 frames is sampled and displayed.

SYSTEM BLOCK DIAGRAM

Figure 4:
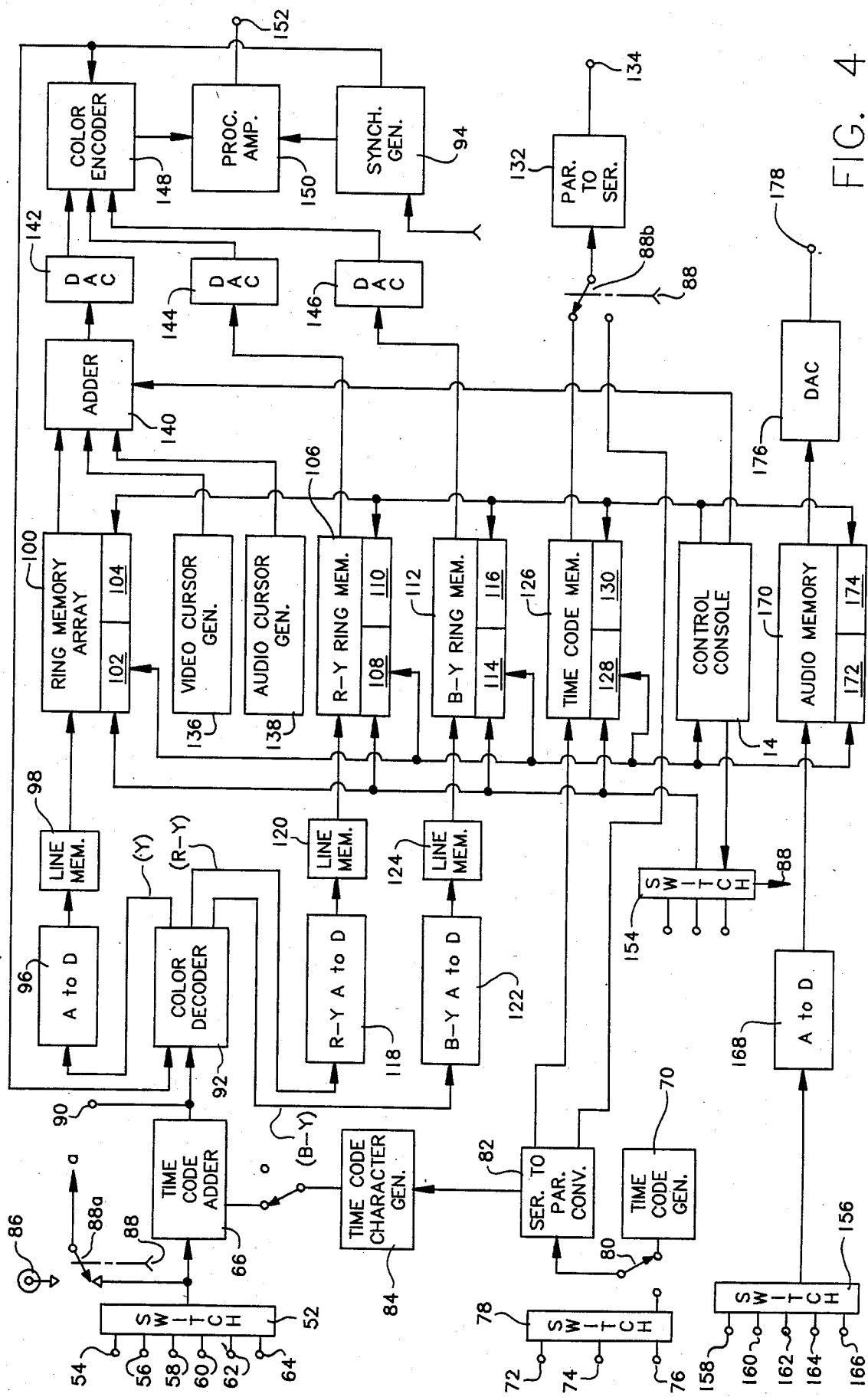
FIG. 4 is an overall electrical block diagram of the monitoring system depicted in FIG. 1.

The structural components of the system 10 and their interrelationships are illustrated in FIG. 4. Therein, a video input selector 52 selects a video signal from a variety of sources which may include a video tape or cassette recorder/player 54, a video camera 56, a telecine converter system 58, an x-ray machine 60, a broadcast tuner-receiver 62 or an optical data recorder/player 64, for example. The video input signal may be composite color or monochrome and should follow the RS 170 standard (U.S.) or the CCIR standard (European) signal format and timing relationship, although other signal (synchronizing pulse) formats may be employed, depending upon the application. While the system 10 is illustrated in FIG. 4 as handling NTSC composite color, in some applications such as picture editing a monochrome signal has been found to be entirely satisfactory. If only monochrome signal processing isrequired, the system 10 may be simplified by omission of the color component memory units described hereinafter.

The first processing step occurs at a time code to video adder block 66. This block functions to add a standard time code, such as the SMPTE time code, to each video frame, providing a switch 68 is set as shown in FIG. 4 and further providing that a suitable time code signal stream is provided e.g. from an internal time code generator 70, or from a selected external time code source. The external time code sources may include an external generator 72, a time code track of a video or audio recorder/player 74, or a broadcast tuner/receiver 76, and one of them may be selected through a time code selector 78. An internal/external time code selector switch 80 selects between the internal generator 70 and the selector 78. The selected time code signal stream passes through a time code reader and serial to parallel converter block 82 and thence through a time code to character generator converter 84 before reaching the adder circuit 66. The time code reader-converter 82 deciphers the time code into storable binary informaton and reformants the resultant binary into a parallel data word for each frame. The time code to character generator converts each time code into a pixel display suitable for insertion into the analog video data stream entering the time code to video adder block 66.

A jack 86 provides an input to an external reference video source, such as a synchronizing generator, and this video is input through a relay contact set 88a to the adder 66 when the freeze control 34 is actuated by the operator and the system 10 enters the video frame freeze mode. An optional analog video output node 90 is provided for e.g. an external monitor display of the incoming video signal with time coding added thereto.

A standard hetrodyne color decoder 92 receives the incoming composite video from the adder 66 and also receive a color subcarrier signal from an internal color synchronizing pulse generator 94. The decoder 92 functions to separate the color composite video into a luminance or green (Y) component, a red minus green (R-Y) component and a blue minus green (B-Y) component. The luminance component (Y) enters a luminance analog to digital converter 96 where it is converted to a digital data stream at a sampling rate of e.g. 512 samples per line. Each sampled picture element (pixel) is converted to a binary value in a range from zero to 255 (8 bit data word per pixel or any other useful bit/pixel range).

Once the line has been transformed into e.g. 512 digital data values or samples (pixels), those values enter a line store memory 98 where they are sub sampled. Requisite data compression occurs at this point. Instead of storing every sample for the line, only one in four samples is stored in the array 98. In this manner, the horizontal line is compressed to one fourth of its original data content. Then, every fourth line is written into storage. The compressed digital video line then enters a 512 byte by 512 byte, 32 subfield memory array block 100. While some slight picture degradation occurs, the result is very satisfactory for the present purposes. This data compression enables the monitor 16 to display four picture lines for each raster line of the display 18. When every fourth line is sampled and stored, the resultant compression of a single picture image to one-sixteenth of its original area is accomplished for each field. This method of compression is far simpler to achieve and provides more useable results than heretofore achieved with energy transformation and compaction techniques.

The memory array 100 includes an internal address generator 102 and also a read/write control 104. The address generator generates suitable addresses for storing and reading out the digitized and selected video pixels and lines in appropriate locations of the array 100. The array 100 is configured as a giant ring counter having 32 separate compartments. The address generator 102 and the read/write control 104 cooperate so that one compartment is being written while the other thirty one compartments are readable (although only sixteen are being read at any one time for display purposes). The location corresponding to the newest frame 20a is being written over the oldest frame in a progressive fashion with writing occurring only during the horizontal blanking interval. During playback e.g. one half of the sampled pixels stored in the line memory 98 are written to the appropriate portion of the new frame compartment of the array 100 during the horizontal blanking interval following the first line scan. The second half of the sampled pixels are written during the second horizontal blanking interval. Nothing happens during the third and fourth horizontal intervals. This sequence is then repeated at the 5th, 9th, 13th etc. lines so that by the time that all lines have been read out in playback, a new frame has been completely stored in the selected new frame compartment of the array 100, with all writing operations having been carried out during the selected horizontal blanking intervals of the frame, as just explained.

Once a frame is written into the newest frame compartment, the write pointer advances to the next oldest frame and it is then overwritten with the next incoming frame, and so forth, and this overwrite continues until a freeze operation occurs. Then, all writing ceases and the memory remains in a static read state. The memory array 100 and its related control circuitry 102, 104 is hereinafter shown and described in greater detail in connection with FIG. 6.

Two additional memory arrays 106 and 112, substantially identical to the array 100, are provided when color television signals are being processed. The array 106 stores the (R-Y) color component, and it includes its own address generator 108 and read/write control 110. The array 112 stores the (B-Y) color component and it includes its own address generator 114 and read/write control 116.

A (R-Y) analog to digital converter 118 receives the (R-Y) component from the color decoder 92 and converts the analog line subcarrier component signal into e.g 512 samples. Every fourth sample is stored in a (R-Y) line store 120. The stored, sampled digitized (R-Y) digital values are then stored in the (R-Y) array 106 in synchronization with the storage of the luminance (Y) values in the memory 100.

A (B-Y) analog to digital converter 122 and associated (B-Y) line store 124 operate in the same manner as the converter 118 and store 120 to digitize, sample and put out selected (B-Y) values to the memory array 112.

A time code memory array 126 is provided for storing a time code corresponding to each frame being stored in the array 100. The time code memory array has or needs only 32 memory locations for video only, 128 for 4 seconds of audio, one corresponding to each frame stored in the array 100. The time code memory array 126 includes suitable address generation 128 and read/write control 130 circuitry in accordance with well known principles and further in consonance with the structure and operation of the address generator 102 and read/write control circuit 104 described in greater detail hereinafter.

A time code parallel to serial converter 132 converts real time or stored time codes into serial format and put the serialized time code stream out at an output 134 for connection to e.g. a color correction computer or television editing computer, depending upon the environmental application of the system 10. The time code input to the converter 132 is selected through relay contacts 88b which operate in response to activation of e.g. the freeze switch 34. During the freeze mode, the time code put out by the converter 132 comes from the time code memory array 126. Normally, the time code is put out directly from the time code reader 82.

Figure 5B:
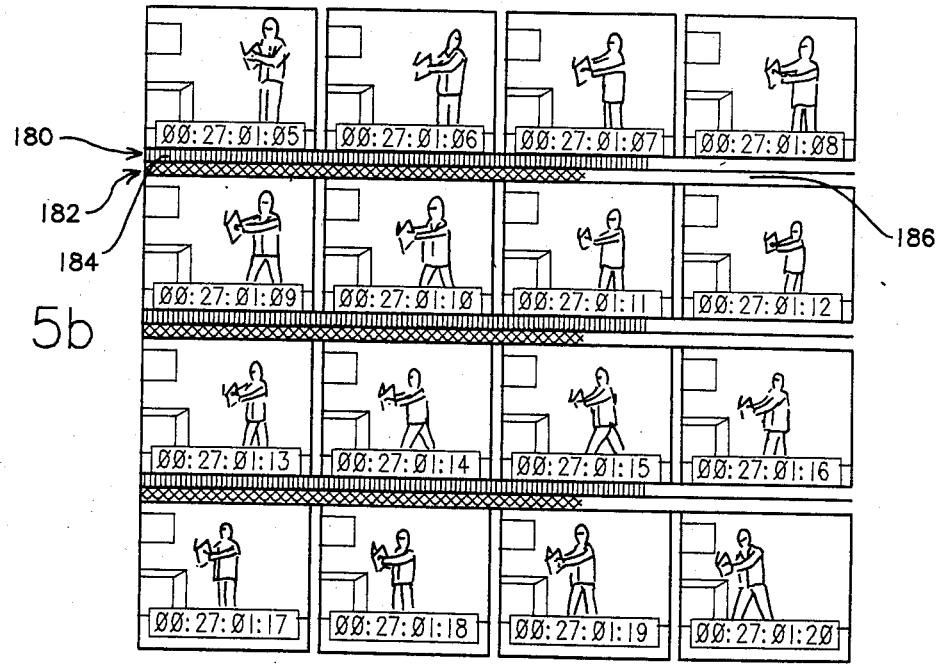

The system 10 includes a video cursor generator 136 and an audio cursor generator 138. The video cursor generator 136 generates the visual border 38 which may be selected for a particular frame 20, as shown for the frame 20i in FIG. 2. The audio cursor generator 138 generates as a visual cursor a series of vertical lines in a horizontal line (FIG. 5B). Each bar corresponds generally to the picture frame coincident with that portion of the audio sound track. An adjacent bar comprising a white segment on the left and a dark segment on the right, or vica versa, is used to point to a particular vertical bar which is the selected audio point. In the audio cursor and freeze mode of operation, the joystick 26 may be used to extend the white segment to a particular vertical bar in order to adjust the edit point. Once a particular vertical bar is selected, the time code for that bar and frame is automatically put out. It should be understood that the operator can hear the audio information stored in the audio memory (up to four seconds) in real time playback up to the point where the lower white cursor ends. In this way a very precise audio edit is achievable.

The digital video signals from the (Y) video memory array 100 along with digital video signals corresponding to the video cursor 38 from the video cursor generator 136 and an audio cursor as described from the audio cursor generator 138 are combined together in a border adder and audio cursor adder circuit 140. A control signal to circuit 140 from the control panel 14 causes the adder circuit 140 to insert either the video cursor or the audio cursor into the luminance video data stream, depending upon whether video or audio is selected at the cursor select switch 32 and further depending upon the particular signal compression rate as established by the selected one of the four switches 40, 42, 44 or 46.

A digital to analog converter 142, such as type TRW 1016 manufactured by TRW, or equivalent, converts the resultant video signal put out by the adder into an analog signal stream. In similar manner, digital to analog converters 144, 146 convert the color components from the arrays 106, 112, respectively, into synchronized analog signal streams. The three analog signal streams are recombined into composite color in an encoder block 148. A processing amplifier 150 adds appropriate processed synch signals from the generator 94 to the color video, amplifies the video and puts it out at an output node 152.

An OR gate 154 selects frame freeze data from a plurality e.g. 156, 158 or 160 of external frame freeze initiating sources which may be the manual push button 34, a time code decoder, a color hue detector (since change in hue often accompanies scene change), a sound level or pitch detector, a video luminance level detector, a periodic oscillator, a video motion detector, or a composite of these sources. The OR gate 154 operates the relay 88 whose contact sets have previously been described.

The joystick control 26 is implemented with analog resistances which produce values which are converted to digital and are then applied to the address generators of the memories 100, 106, 112 and 126 so that stored frames may be scrolled back and forth while the system 10 is in freeze mode by joystick angle.

The system 10 includes an audio signal storage path. This path is implemented with an audio source selector 156 which selects analog audio from an audio track 158 of a magnetic recorder/player, a microphone 160, a tele-cine audio channel 162, a broadcast tuner/receiver 164, or an optical recorder/player 166, for example. The selected audio is sampled and digitized in an audio analog to digital converter 168. The converter 168 may be implemented with two integrated circuits: and AMD 2502 successive approximation register and an AMD 6071 companding digital to analog converter, both made by Advanced Micro-Devices, or equivalent. The connection of these components to achieve the analog to digital converter is set forth in an AMD publication entitled *Analog and Communications Products,* Data Acquisition Telecommunciations Local Area Networks 19834 Data Book, as FIG. 23 appearing at page 3-85 of this book, the same being specifically incorporated herein by reference.

A four second audio memory array 170 is implemented in similar fashion as the memory 100, previously described. The audio memory array 170 includes an address generator 172 and a read/write control 174 which operate in the same manner as the generator 102 and control 104, respectively. A digital to analog converter 176, such as type AMD 6071, converts the digitized audio into an analog audio stream and puts it out at an audio output node 178.

The visual cursor corresponding to the audio signal component may be of several types. As already explained, one preferred type, shown in the graph set forth as FIG. 5B, employs two horizontal bars 180 and 182 imposed along the bottom of the video frames. The top horizontal bar sets forth a series of equally spaced apart visual serrations 184 which constantly move. Each serration corresponds to a video frame (and time code). The bottom bar 182 comprises a white component and a black component. The white component 184 corresponds to the sound actually heard in conjunction with the displayed video frames. The black component 186 marks the cutoff location of the audio track. In the freeze mode the white-black ratio of the bottom bar 182 may be adjusted by the joystick 26 when audio cursor mode is selected at the switch 32. This enables the operator to hear the audio track for the picture frames denoted by the serrations and to set the cursor bar 182 at an appropriate pause in the audio track for edit. Once the lower audio cursor 182 is set, the time code for the video frame (as denoted by a serration in the bar 180) is put out at the time code output 134 to appropriate external editing equipment. An advantage of the audio storage feature of the system 10 is that the audio segment in storage 170 may be played out at real time rates, over and over, until an appropriate edit point is located. This is to be contrasted with prior art methods in which audio reproduction was e.g. a function of velocity of film over a sound track pickup in a film editor. The time code indicated visually in the frame adjacent to the transition between white 184 and black 186 is the actual time code which exits the time code output node 134.

SUBFIELD MEMORY ARRAY BLOCK 100

A detailed schematic diagram for the subfield memory array block 100, including the address generator 102 and the read/write control 104 is set forth as a series of figures, FIGS. 6a, 6b, 6c, 6d, 6f, 6g, 6h and 6i. These nine figures should be read together as a single diagram in accordance with the overall layout arrangement set forth in FIG. 6, and interconnecting common signal paths bear the same two letter reference designators on each of the figures. A detailed description of each component will not be provided herein, as sufficient information to duplicate the circuitry will be apparent to those skilled in the art from a thoughtful consideration of the schematic diagram itself.

The memory array block 100 (FIGS. 6h and 6i) is preferably implemented as a 512 by 512 (256k) by eight bit frame buffer configured to operated in a read, modified write mode (i.e. while reading, writing may occur immediately after the read at the same location, but not at a new or different location). The memory array is preferably implemented with 64K by one bit dynamic memory chips (type 4164, for example). A multiplexed addresing system is employed which first generates and clocks an eight bit code for the row address to the array; an eight bit column address is then generated and clocked to the array. After these addresses are digested by the array, since it is a dual port array, the selected data bit from the selected chip and address is available at the selected chip's output or "Q" port. Simultaneously a new value may be put into the input or "D" port of the selected chip, and that new value will then replace the value being put out at the Q output port.

One novel feature of the memory array 100 is the manner in which data compression is carried out. The line store 98 stores the line. A selected sampled portion of the line being stored in the line store 98 is then put out during the horizontal blanking interval in real time. All writing into the memory array 100 of the selected sampled line portion data occurs during the horizontal blanking time interval. Thus, for each line every fourth pixel is selected and written. In like manner, every fourth line is written. These two sampling steps yield a sixteen to one data compression and enable sixteen frame (field) images to be displayed in the time ordinarily taken to display one picture frame (1/30 of a second).

During the active display period, the memory array 100 is being constantly cycled and read in real time so that the data being put out as an eight bit stream comprises each pixel value being scanned and illuminated on the picture screen 18 of the monitor 16. As a ring-configured storage array, the newest picture information i.e. for frame 20a is written into that portion of the array in place of the oldest picture information (which is sixteen frames after the oldest display image, frame 20p, since the array 100 holds e.g. 32 picture frames, or approximately one full second of real time video information).

The address generator 102 includes counters which are incremented to cause the array to be continually cycled during the read out operation. A relative address starting point is zeroed for each frame. At the end of each horizontal scanning line, the line address is incremented by one. Each scanning line stored in the memory 100 contains pixel values for four frames, e.g. frames 20a, 20b, 20c and 20d. In a scan of the electron beam of the monitor 16 from left to right, the pixel values read out of the memory 100 are first for a line of frame 20d, an aligned line of frame 20c, an aligned line of 20b, and finally an aligned line of 20a, the right-most frame. At the end of the real time scanning line one half of the addresses for the latest frame 20a would be written, as previously explained. Then the next line is scanned which displays the four lines of the four frames, and so forth.

Figure 6:
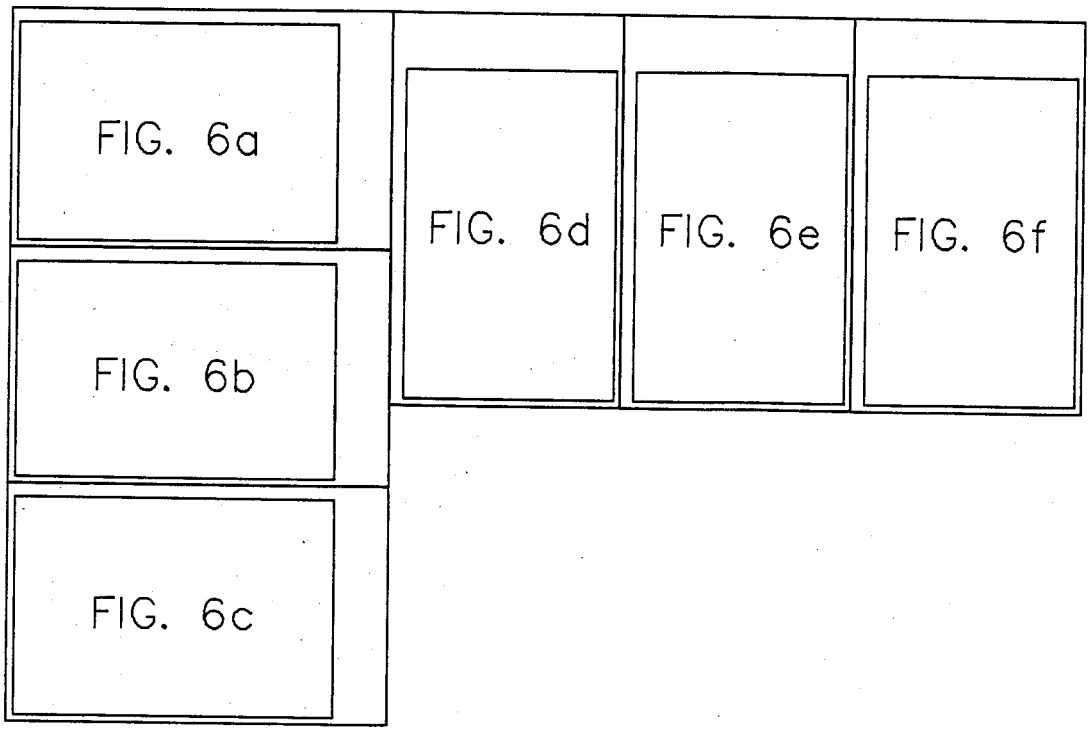
FIG. 6 sets forth an overall layout plan for FIGS. 6a through 6i and FIG. 6 should be referred to when considering the disclosures of these figures.
Figure 6:
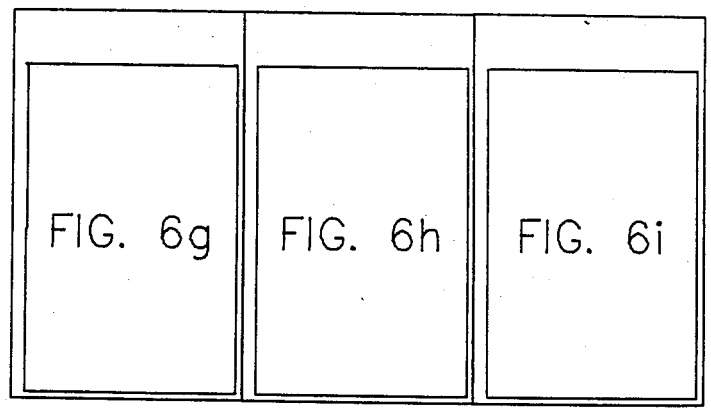

Implementation of the array 100 requires a number of functional sub-blocks which are shown as the drawings of FIG. 6. While each sub-block is discussed separately, it is to be understood that the circuitry is highly interactive and that the activites of one sub-block may well affect directly the activities of others.

The address generator 102 (FIGS. 6a, d and e) includes a master latch control timing generator 202, which enables data input latches 204, 206, 208 and 210 and which enables data output latches 212, 214, 216 and 218. This generator 202 is essentially the heart of the frame buffer array 100. Eight data words (pixels) are written into the input latches 204–210 and eight data words are also written into the four output latches 212–218. The generator 202 generates the necessary strobe timing for the input and output latches.

Figure 6B:
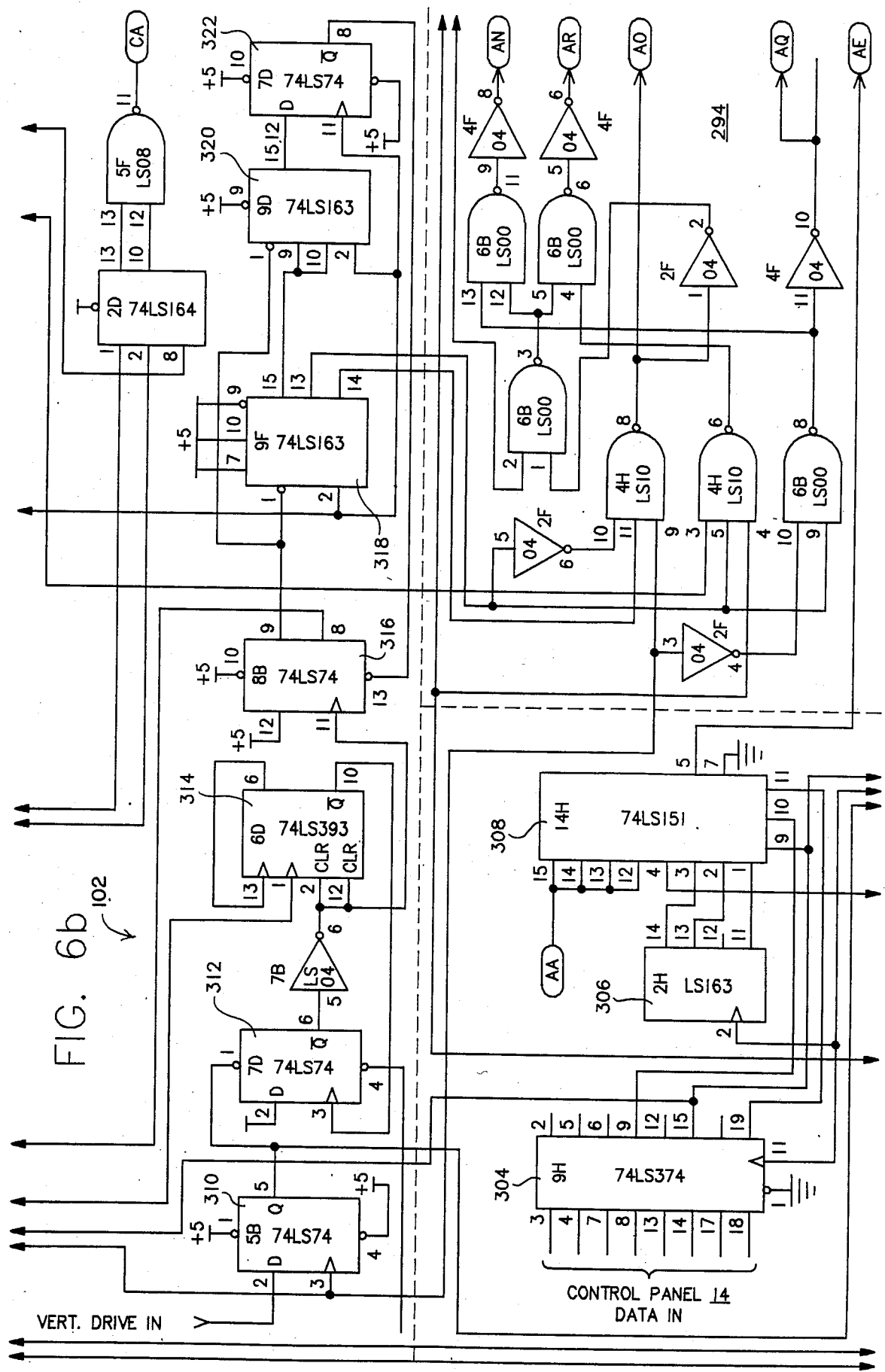
Figure 6C:
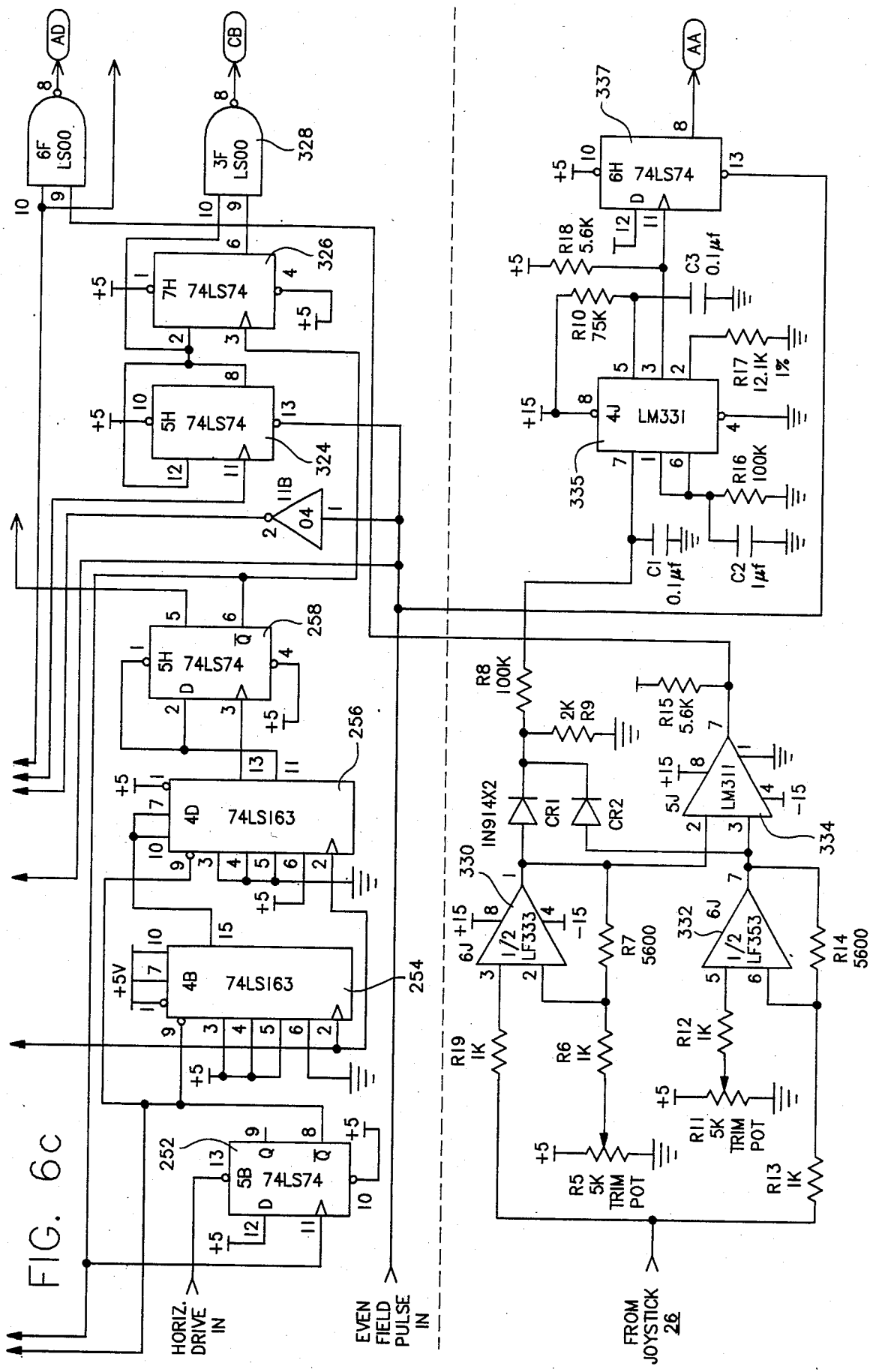
Figure 6D:
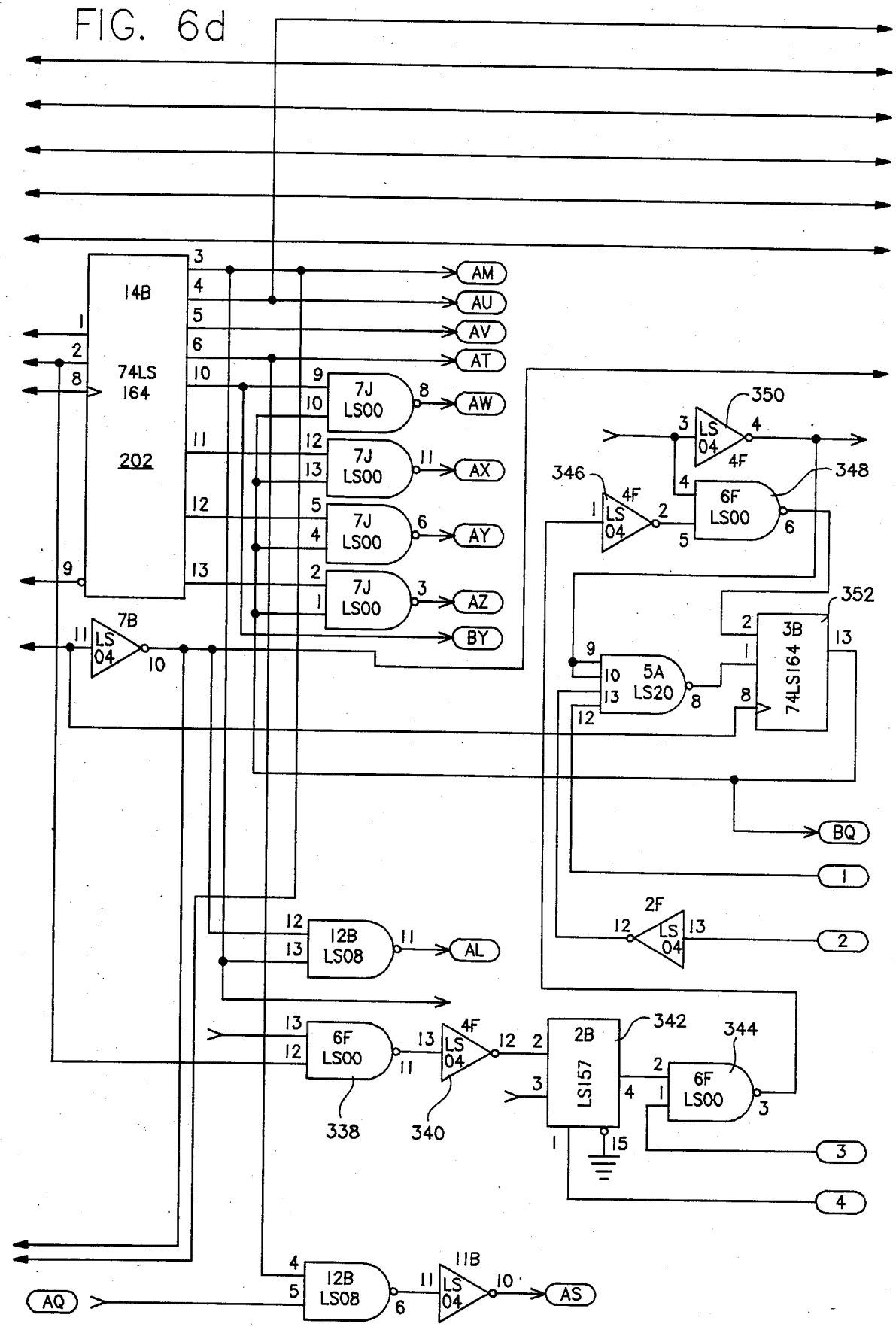

Four master read/write address counters 222, 224 226 and 228 (FIG. 6e) are commonly clocked at an appropriate pixel sample rate via a signal on a line from an inverter 7B (FIG. 6d). This rate is derived in part in response to the even field pulse signal from the synchronizing generator 94. A signal on a line CB clears the counters 222, 224, 226 and 228 at the beginning of each frame. In regular television, the picture is interlaced, i.e. scanned as 256 lines in an even field and then scanned as 256 lines between the even field lines in an odd field. The present invention stores only even field data (or odd field data, depending upon a jumper). Thus, the use of the even field pulse. It is to be understood that the terms frame, field and subfield are given equivalent meanings herein and that a stored field is read twice to achieve interlacing of the frame.

The counters are paired into two sets. Output from the first set 222, 224 is latched into a latch 230. Output from the second set (FIG. 6e) 226, 228 is latched into a latch 232. At the end of a real-time horizontal line the addresses are loaded into the latches 230, 232 and held.

A temporary buffer 234 holds data from one of the latches 230, 232. This buffer circuit 234 allows the counters 222 through 228 to operate as two separate counter chains.

Figure 6E:
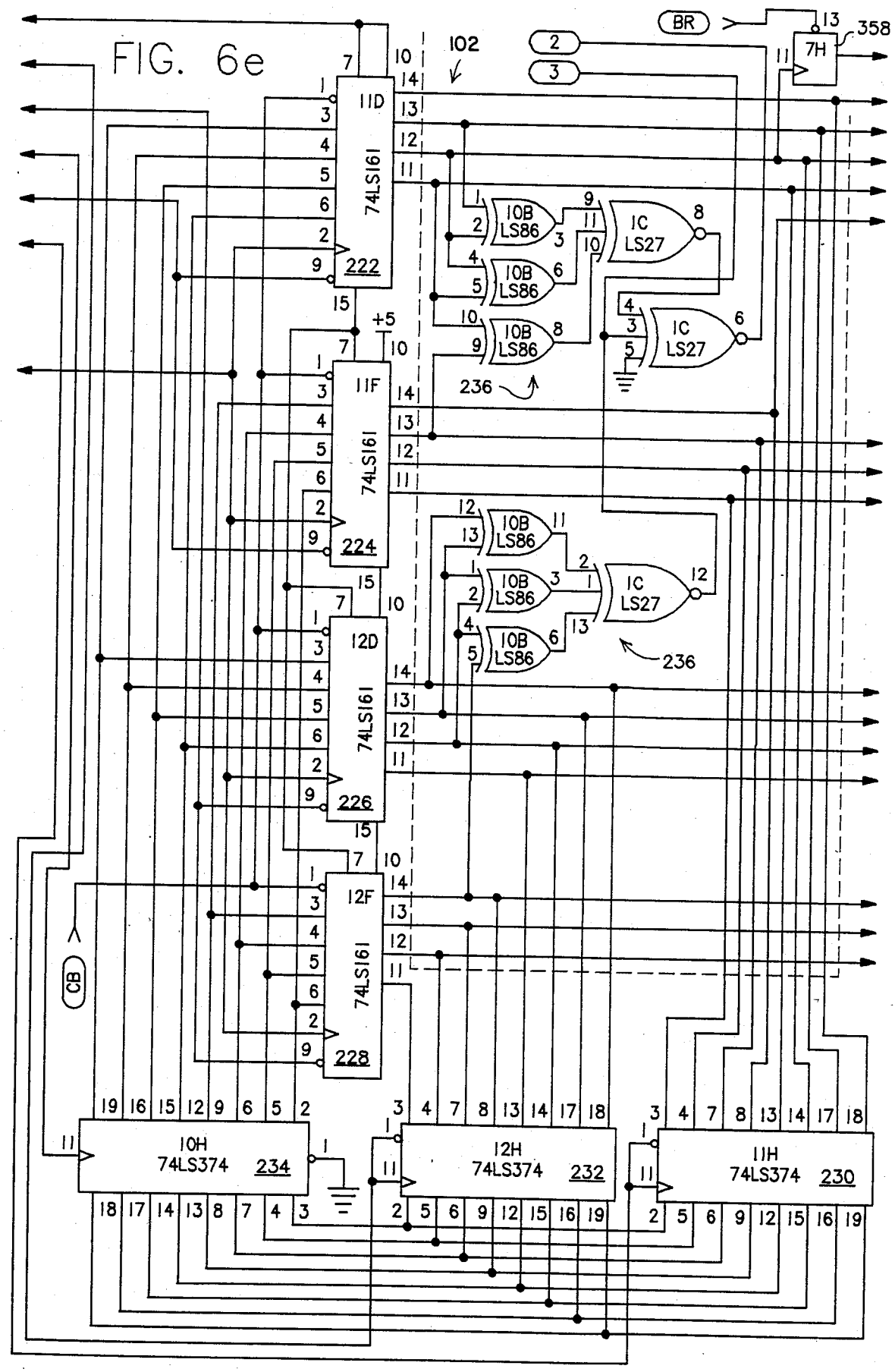

A video border cursor generator 236 is implemented with the array of exclusive-or gates configured as shown in FIG. 6e. This video border cursor generator 236 is connected to the master counters 222 and 226 in order to receive the pixel and line addresses of a selected subframe 20a–20j and generate a white border at the periphery thereof. A data comparator 237 determines which subframe will be bordered by the cursor.

The count from a subframe counter 248 (FIG. 6f) is added in an adder 238 to the count from the counter 224 (one quarter and one half line) and also the the count from the counter 228 (which is one quarter field and one half field).

Three selectors 240, 242, and 244 select between normal read address and the most current subframe address which will have a write following a read. The values from the counter 222 and from the selectors 240, 242 and 244 are then put out to a monolithic address controller 246 (FIG. 6g), such as the Texas Instruments' type TMS 4500A Dynamic RAM Controller, or equivalent, as shown in FIG. 6e. The controller 246 additionally generates the necessary refresh pulses for the dynamic memory array.

Figure 6F:
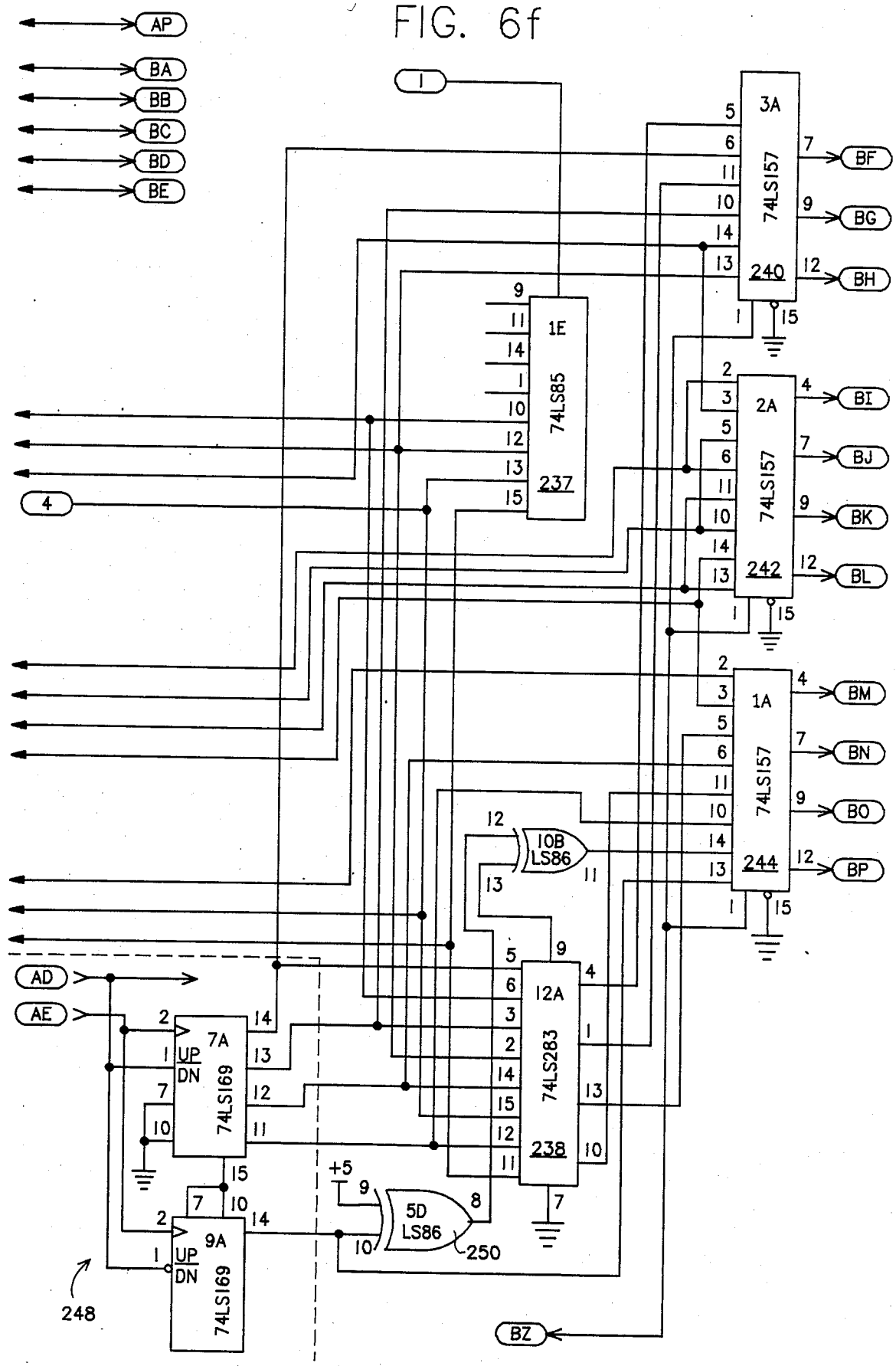
Figure 6G:
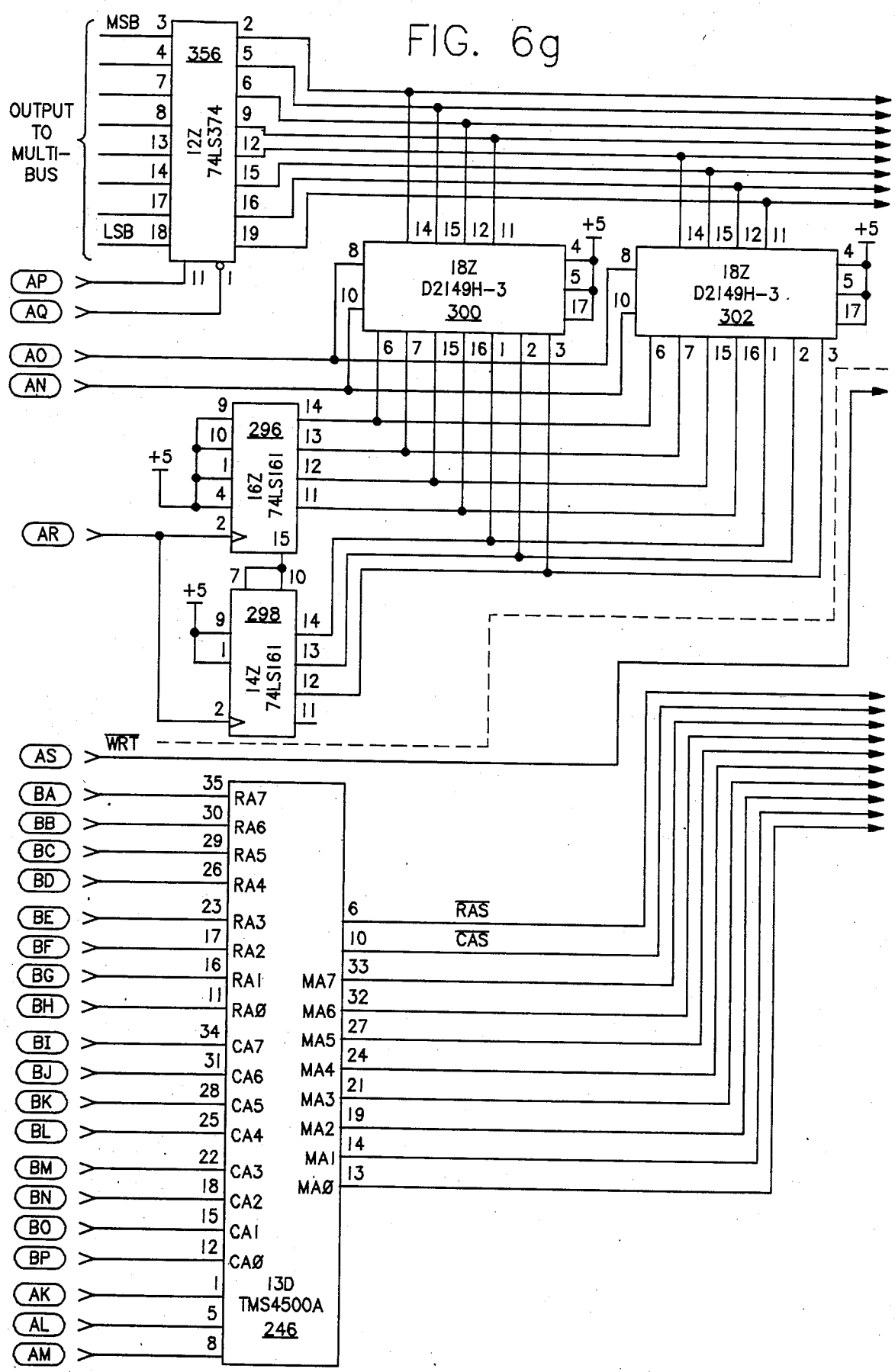
Figure 6H:
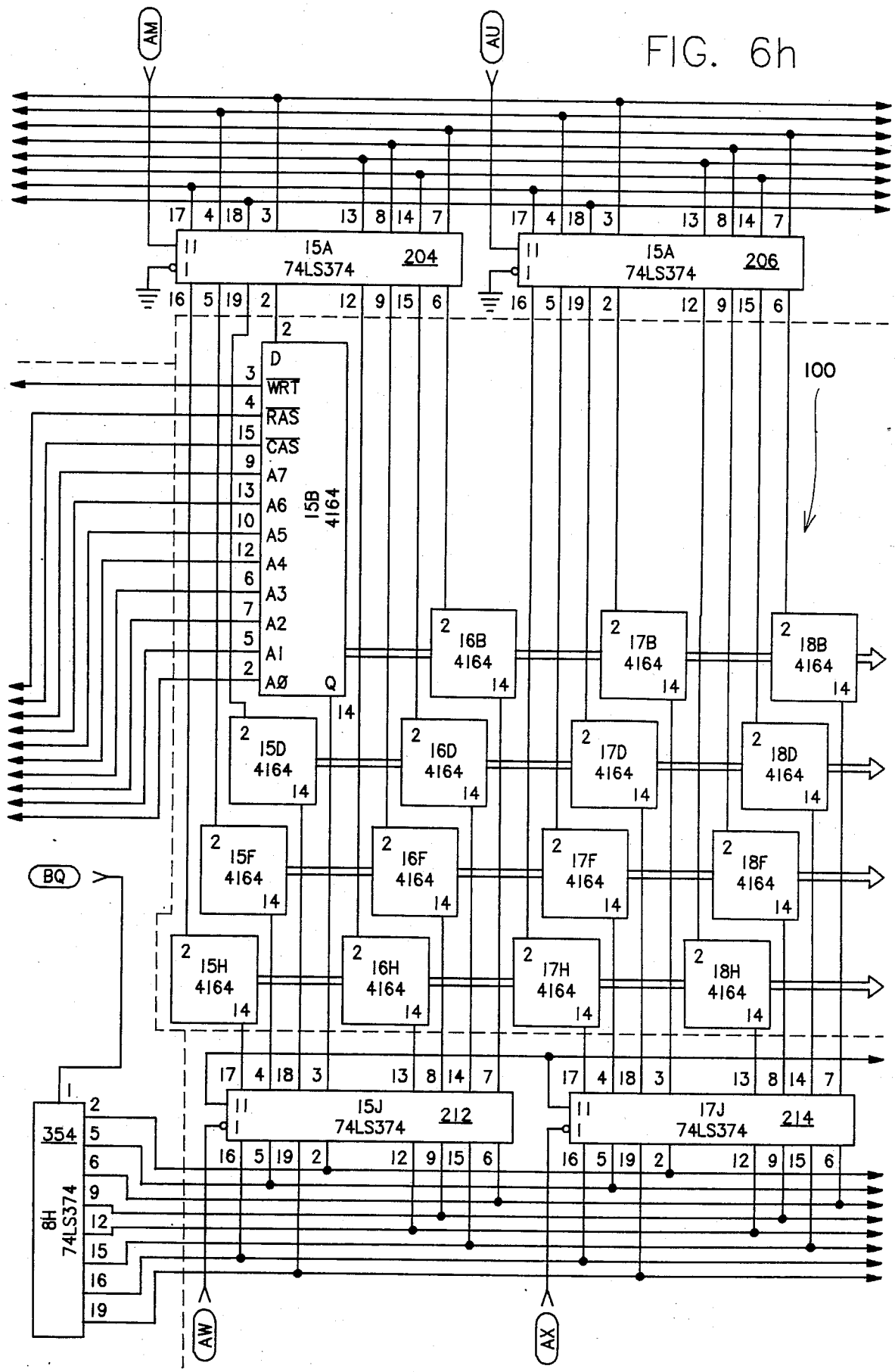
Figure 6I:
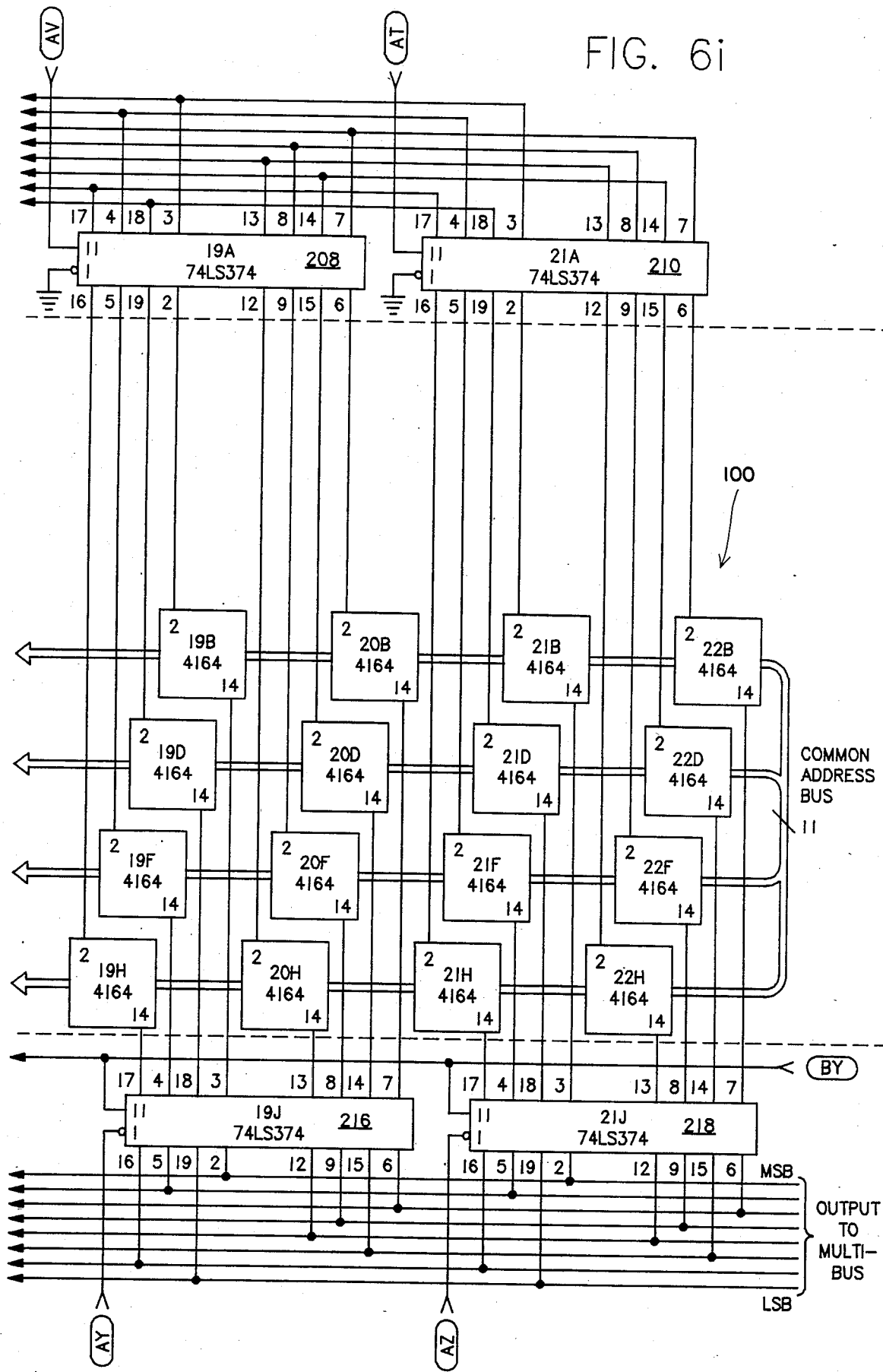

The subframe location counter 248, FIG. 6f, keeps track of the location of the subframe to be written to during read of each horizontal line. A one-bit toggle gate 250 may be used in addition to or in lieu of the joystick 26 to toggle the address selector 244 so that the first 16 or the second 16 of the stored 32 frames (or subframes, the terms being used interchangeably herein) will be put out to the monitor 16.

Synchronizing pulses including horizontal synch and vertical synch are supplied to the memory array 100 from the synchronizing generator 94. The horizontal drive pulses enter a counter chain comprising counters 252, 254, 256 and 258 (FIG. 6c) which are configured to divide the horizontal drive rate by 512.

A 10 megahertz clock signal enters a counter chain comprising counters 260, 262, 264 and 266 (FIG. 6a) which provides two counts, a 512 count for line read and a 64 count for writing which occurs during the horizontal blanking interval. A logic array comprising gates 268, 270, 272 and 274 controls switching of the counter chain between 512 and 64.

A timing pulse generator comprises a chain of ripple latches 276, 278, 280, 282 and an exclusive OR gate 284 (FIG. 6a). This generator receives the horizontal pulse from the counter 258 and develops necessary timing pulses. A shift register 286 generates a pulse pair which switches the address master counters from read to write mode at the end of each line. Three gates 288, 290 and 292 provide a slight (10 ns) delay to the signals from the register 286 so that the control signals arrive at the counting chain in proper time relationship.

A line store timing circuit 294. Comprising a plurality of gates arranged as shown at the lower right of FIG. 6b, controls the writing of every fourth pixel into the memory array. The circuit 294 controls two counters 296, 298 (FIG. 6g) which generate line store addresses. These line store addresses are applied to two line store memories 300, 302 which implement the line store 98. Every fourth pixel stored in the memories 300, 302 in real time is strobed onto the data input bus to the latches 204–210 during the horizontal blanking interval.

Input data from the control panel 14 enters the control circuitry through a latch 304 (FIG. 6b). A controllable counter comprising chips 306 and 308 responds to input from the frame sampling rate switches 40–46 on the control panel 14.

Vertical drive enters a counting chain comprising flipflops 310, 312, 314, 316, 318, 320, 322 configured as shown on FIG. 6b. Various pulses derived from the vertical interval rate are generated by this counting chain.

The clock for clearing the master counters at frame time is derived by a chain comprising latches 324, 326 and gate 328 (FIG. 6c) which operate from information derived from the vertical and horizontal drive pulses. A wide composite blanking signal is available at the line CA (FIG. 6b) for external synchronizing purposes.

An interface circuit for the joystick 26 is depicted in FIG. 6c. Therein voltage values from the joystick 26 are applied to two comparators 330, 332. The complementary digital outputs from the comparators 330, 332 are applied to a comparator 334. This comparator 334 generates an output on a line which is combined with a control panel bit from the latch 304 in a gate 6F (FIG. 6c). The gate 6F operates the subframe location counter 248 (FIG. 6f) which is clocked by a pulse on line AE which is a function of the frame sampling rate as determined at the counter 308. Rectified outputs from the comparators 330, 332 control the frequency of a voltage frequency converter 335 which feeds a latch 337. The output from the latch 337 on line AA controls the advance of the subframes by providing data inputs to the data selector 308. The even field pulse on line AB resets the latch 337 to synchronize slow pulses to frame intervals.

The video part of the audio cursor depicted in FIG. 5B is generated by a logic gate array depicted in FIG. 6d. This array includes a gate 338, an inverter 340, a latch 342, another gate 344, another inverter 346, another gate 348, another inverter 350 and a shift register 352, configured as shown.

The shift register 352 operates for both the video and audio cursor, and its output on line BQ strobes a white border cursor latch 354 paralleling the eight bit output data bus (FIG. 6E).

Digitized pixel data from the analog to digital converter 96 (FIG. 4) enters the input bus through a latch 356 which is strobed by a clocking signal generated in a latch 358 (FIG. 6e) in response to a clocking signal on a line from the master counter 222 and a reset signal from the counter 264 in the 10 MHz counter chain (FIG. 6a). Data read out of the array 100 is placed on an output to multibus to the digital to analog converter 142.

To those skilled in the art many changes in construction and widely varying embodiments and implementations of the present invention will be suggested by the foregoing description of a preferred embodiment without departure from the spirit or scope of the presesnt invention. The disclosures herein are purely illustrative and are not intended to be in any sense limiting.

We claim:

1. A memory array for storing and playing back digital values derived from an analog data stream from a source of real time successive video picture image fields, said memory comprising:
    input means for receiving said digital values,
    line store means connected to said input means for storing said digital values which correspond to each incoming line of video,
    read/write ring memory array means for storing a plurality of successive video fields comprised of sampled ones of said digital values from said line store means in accordance with a sampling rate which determines the minimum number of successive picture fields to be stored in said memory array means, there being at least one field of each picture frame being stored,
    read control means connected to said read/write ring memory array means for cyclically reading said memory array means during each video line time interval to generate a digital data stream in real time corresponding to said plurality of successive video fields,
    write control means connected to said line store means and to said read/write ring memory array means for periodically writing digital values sampled from a current incoming video line in place of digital values sampled from the oldest stored video line,
    output means connected so said read/write ring memory array means and to said read control means for putting out said digital data stream.

2. The memory array set forth in claim 1 wherein said write control means includes timing means for writing said digital values only during selected horizontal blanking intervals.

3. The memory array set forth in claim 1 wherein said write control means includes manual freeze switch means for starting and stopping periodic writing of said digital values sampled from a current incoming video line.

4. The memory array set forth in claim 1 further comprising video cursor generator means connected to said output means for generating a cursor marker for a selected one of said pluraltiy of video fields stored in said ring memory array means and read by said read control means.

5. The memory array set forth in claim 4 further comprising switch array means for switchably controlling the location of placement of said cursor.

6. The memory array set forth in claim 5 wherein said switch array means comprises a switch dedicated to each video field location and wherein said switch array is laid out to correspond to the presentation of said plurality of video fields on a picture screen.

7. The memory array set forth in claim 1 further comprising field samplng rate control means connected to said write control means for selecting the field sampling rate.

8. The memory array set forth in claim 7 wherein said field sampling rate control means includes switch means for switching between at least a one to one and a one to n field sampling rate wherein n equals an integral power of two or from an external source.

9. The memory array set forth in claim 7 wherein said field sampling rate control means includes switch means for selecting a sampling rate from an external source sampling rate means.

10. The memory array set forth in claim 1 wherein said ring memory array means comprises a storage capacity greater than that required to store the plurality of successive video fields to be displayed, said write control means includes manual freeze switch means for starting and stopping periodic writing of said digital values sampled from a current incoming video line, and further comprises joystick control means connected to said read control means for enabling read out of any selected portion of said ring memory array means when writing has been stopped.

11. The memory array set forth in claim 10 wherein said joystick control means includes a manually operable joystick and a manual field freeze switch included within a control console.

12. The memory array set forth in claim 11 further comprising video cursor generator means connected to said output means for generating a cursor marker for a selected one of said plurality of video fields stored in said ring memory array means and read by said read control means, and further comprising switch array means for switchably controlling the location of placement of said cursor, said switch array means including a switch array in said control console dedicated to each video field location and wherein said switch array is laid out ot correspond to the presentation of said plurality of video fields on a picture screen.

13. The memory array set forth in claim 11 further comprising field sampling rate control means connected to said write control means for selecting the field sampling rate, and wherein said field sampling rate control means includes switch means including at least one switch in said control console for switching between at least a one to one and a one to n field sampling rate wherein n equals an integral power of two.

14. A monitoring system for monitoring a data stream of analog information provided from a source wherein said information is divided into a series of blocks, each block being identifiable as such, said monitoring system comprising:
   analog to digital converter means connected to said source for converting said analog information into a digital stream of corresponding digital values,
   ring memory array means connected to said analog to digital converter means for storing said corresponding digital values and including address generation means for generating addresses which progress throughout the entirety of storage locations of said memory in repetitive fashion and read/write control means for replacing the oldest stored corresponding digital values with the latest corresponding digital values, and including freeze switch means for disabling writing of latest corresponding digital values into said array means,
   digital to analog converter means connected to memory array means for converting said stored digital values to analog values and for putting them out,
   block indentifier means for providing and putting out a unique block indentification value for each said block put out by said digital to analog converter means, said block identifier means being responsive to said freeze switch means so that during cessation of writing, each block put out bears the same identification value.

15. The monitoring system set forth in claim 14 wherein said data stream of analog information comprises audio information wherein said blocks are defined by time increments, each increment having its own unique identifier.

16. The monitoring system set forth in claim 14 wherein said data stream of analog information comprises television video and further comprising temporary storage means connected to said analog to digital converter means for temporarily storing said digital stream at a storage rate related to the video rate of said analog data stream, and wherein said ring memory array means is connected to said temporary storage means for storing a plurality of successive video fields comprised of sampled ones of said digital values from said line store means in accordance with a sampling rate which determines the minimum number of successive picture fields to be stored in said memory array means.

17. The monitoring system set forth in claim 16 further comprising video cursor generator means connected to said analog to digital converter means for generating a cursor marker for a selected one of said plurality of video fields stored in said ring memory array means and read by said read control means, said cursor generator means comprising switch array means for switchably controlling the location of placement of said cursor on a television display screen, said switch array means including a switch dedicated to each video field location and wherein said switch array is laid out to correspond to the presentation of said plurality of video fields on said picture screen.

18. The monitoring system set forth in claim 17 wherein said data stream of analog information comprises an audio information component wherein blocks thereof are defined by time increments, each increment having its own unique identifier, said system further comprising:
   audio analog to digital converter means connected to said source for converting an audio component of said analog information into a digital stream of corresponding digital values,
   audio ring memory array means connected to said audio analog to digital converter means for storing said corresponding digital values and including audio address generation means for generating addresses which progress throughout the entirety of storage locations of said memory in repetitive fashion and audio read/write control means for replacing the oldest stored corresponding digital values with the latest corresponding digital values, and including audio freeze switch means for disabling writing of latest corresponding digital values into said array means,
   audio digital to analog converter means connected to said memory array means for converting and putting out said stored digital values to analog values, and
   audio block identifier means for providing and putting out a unique block indentification value for each said audio block put out by said audio output amplifier means, said block identifier means being responsive to said freeze switch means so that during cessation of writing of said audio ring memory means each audio block put out bears the same identification value.

19. The system set forth in claim 18 further comprising audio visual cursor generator means for generating a video cursor corresponding to said audio, and cursor control switch means for switching cursor output between said video cursor generator means and said audio visual cursor generator means.

20. The system set forth in claim 16 wherein said data stream of analog information comprises a color television signal, further comprising color separator means connected to said source for separating said color television signal into a plurality of signal components, each having a luminance frequency bandwith, and wherein there are a plurality of analog to digital converter means, line store means, ring memory array means, and digital to analog converter means, one being for each signal component, and further comprising color combiner means connected to said plurality of digital to analog converter means for combining said signal components into a color television signal.

21. A method for locating scene changes in successive fields of video program material, said method comprising the steps of:

storing a contiguous, continuously advancing segment of successive fields of video in a first recirculating stoppable memory means, simultaneously storing a contiguous, continuously advancing series of field identification values in a second recirculating stoppable memory, there being a unique one of said values being associated with each field being simultaneously stored in said first memory, displaying simultaneously a plurality of said successive fields stored in said first memory on a display screen in which successive fields circulate throughout the display in accordance with a predetermined two dimensional pattern of progression wherein visible scene changes appear to ripple bidimensionally throughout the frames being displayed, simultaneously stopping said first and second memories upon detection of a scene change of interest and putting out a said value corresponding to a displayed field marking the scene change of interest.

22. The method set forth in claim 21 applied to color correction telecine conversion.

* * * * *